United States Patent
Ayyappan et al.

(10) Patent No.: US 10,515,001 B2
(45) Date of Patent: Dec. 24, 2019

(54) SYSTEM AND METHOD FOR AUTOMATING TESTING OF SOFTWARE APPLICATIONS

(71) Applicant: Cognizant Technology Solutions India Pvt. Ltd., Chennai (IN)

(72) Inventors: Prabu Monkayarkarasi Ayyappan, Tamil Nadu (IN); Venkataraman Subramanian Moncompu, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 15/600,101

(22) Filed: May 19, 2017

(65) Prior Publication Data
US 2018/0121336 A1   May 3, 2018

(30) Foreign Application Priority Data
Nov. 2, 2016   (IN) .............. 201641037439

(51) Int. Cl.
*G06F 11/36* (2006.01)
*G06F 11/32* (2006.01)

(52) U.S. Cl.
CPC ........ *G06F 11/3684* (2013.01); *G06F 11/323* (2013.01); *G06F 11/3672* (2013.01);
(Continued)

(58) Field of Classification Search
None
See application file for complete search history.

(56) References Cited

U.S. PATENT DOCUMENTS 7,165,189 B1 * 1/2007 Lakkapragada .... G06F 11/2294 709/220
8,239,831 B2 * 8/2012 Brennan ............. G06F 11/3664 717/124

(Continued)

OTHER PUBLICATIONS

Serrano, "Mobile Web Apps", 2013, IEEE Computer Society, IEEE Software Sep./Oct. 2013 edition.*

(Continued)

*Primary Examiner* — Hossain M Morshed
(74) *Attorney, Agent, or Firm* — Cantor Colburn LLP

(57) ABSTRACT

A system and computer-implemented method for automating testing of software applications based on wireframe of the software applications is provided. The system comprises a test plan module configured to create one or more test cases by providing one or more steps corresponding to the one or more test cases based on wireframe of one or more software applications and associate one or more objects, corresponding action and input parameters to each of the one or more steps. The system further comprises an object mapping module configured to map the one or more associated objects to corresponding one or more elements of the one or more software applications. Furthermore, the system comprises a browser execution module configured to execute the one or more created test cases, on one or more browsers, using the mapped one or more objects to test the one or more software applications and generate test execution results.

15 Claims, 11 Drawing Sheets

(52) U.S. Cl.
CPC ...... *G06F 11/3676* (2013.01); *G06F 11/3688* (2013.01); *G06F 11/3692* (2013.01); *G06F 11/3696* (2013.01)

(56) References Cited

U.S. PATENT DOCUMENTS

| | | | |
|---|---|---|---|
| 8,826,084 B1 | 9/2014 | Gauf | |
| 8,875,102 B1* | 10/2014 | Feng | G06F 9/45529 717/124 |
| 9,058,429 B2* | 6/2015 | Biddle | G06F 11/3688 |
| 9,396,094 B2* | 7/2016 | Browne | G06F 11/3676 |
| 2011/0123973 A1* | 5/2011 | Singh | G06F 11/3668 434/322 |
| 2011/0145783 A1* | 6/2011 | Seshan | G06F 8/10 717/105 |
| 2014/0059522 A1* | 2/2014 | Chandra | G06F 11/3684 717/126 |
| 2014/0068553 A1* | 3/2014 | Balasubramanian | G06F 8/34 717/109 |
| 2014/0281721 A1 | 9/2014 | Navalur | |
| 2016/0283893 A1* | 9/2016 | Dhiman | G06F 8/20 |
| 2017/0337121 A9* | 11/2017 | Singi | G06F 11/3664 |
| 2018/0121336 A1* | 5/2018 | Ayyappan | G06F 11/3684 |

OTHER PUBLICATIONS

Smart, "Grouping Tests Using JUnit Categories", 2010, DZone, Published at https://dzone.com/articles/grouping-tests-using-junit (Year: 2010).*

Conformiq, Automated Test Design™ With Conformiq Tool Suite™ (https://www.conformiq.com/products/) May 12, 2017.

Gallop, Script-less test automation (http://www.gallop.net/); May 12, 2017.

* cited by examiner

FIG. 1H

SYSTEM AND METHOD FOR AUTOMATING TESTING OF SOFTWARE APPLICATIONS

FIELD OF THE INVENTION

The present invention relates generally to software testing. More particularly, the present invention provides a system and method for automating testing of one or more software applications based on wireframe of the one or more software applications.

BACKGROUND OF THE INVENTION

Testing is an important part of any software application development process. Testing user interface of the software applications is crucial as the user interface undergoes many iterations during development process.

Conventionally, various systems and methods exist for testing user interface of software applications. For example, testing tools exist that automate the testing of the user interface of the software applications using test scripts. However, these testing tools suffer from various disadvantages. Script based testing tools use different programming languages and thereby require considerable amount of time and effort for learning the features of the tool and related programming languages. Further, the above-mentioned tools are complex and require skilled resources thereby increasing the overall costs of testing. Furthermore, frequent changes to the user interface requires updating the test scripts frequently, consequently considerable time and effort is spent on maintaining the test scripts. In addition, scripts are difficult to understand and considerable documentation is required for making them accessible to business users. Also, script based testing of software applications is possible only after completion of software applications development.

In light of the abovementioned disadvantages, there is a need for a system and method for automating testing of the software applications based on wireframe of the software applications. Further, there is a need for a system and method that provides a user friendly language for testing which facilitates the business users and technical users to easily test applications without requiring support from expensive and niche resources. Furthermore, there is a need for a system and method that facilitates creating test cases from wireframe while software applications are in development phase. In addition, there is a need for an intuitive and feature rich testing tool that identifies changes to user interface objects and proactively allows the user to update these objects. Also, there is a need for a system and method that supports multiple browsers/platforms thereby permitting cross-browser testing. Further, there is a need for a system and method that allows parallel and distributed execution of test cases. Furthermore, there is a need for a system and method that can be leveraged for performing exploratory testing in agile environments.

SUMMARY OF THE INVENTION

A system, computer-implemented method and computer program product for automating testing of one or more software applications based on wireframe of the one or more software applications is provided. The system comprises a test plan module configured to create one or more test cases by providing one or more steps corresponding to the one or more test cases based on wireframe of one or more software applications under development and associate one or more objects, corresponding action and one or more input parameters to each of the one or more steps of the one or more created test cases. The system further comprises an object mapping module configured to map the one or more associated objects to corresponding one or more elements of the one or more software applications, wherein the mapping is performed on completion of the development of the one or more software applications. Furthermore, the system comprises a browser execution module configured to execute the one or more created test cases, on one or more browsers, using the mapped one or more objects to test the one or more software applications and generate test execution results.

In an embodiment of the present invention, the one or more software applications comprise web applications, mobile applications and mobile hybrid applications. In an embodiment of the present invention, the one or more objects comprise one or more pre-stored functions used for testing the one or more elements of the one or more software applications. In an embodiment of the present invention, the action corresponding to the one or more objects comprise opening a browser window or tab, scrolling a webpage, clicking on one or more fields of the one or more software applications and inputting information.

In an embodiment of the present invention, the one or more browsers comprise Firefox, Chrome, Internet Explorer and Safari. In an embodiment of the present invention, the created one or more test cases are executed simultaneously on the one or more browsers. In an embodiment of the present invention, the test execution results comprise start time of execution, end time of execution, date of execution, total duration of execution, run configuration, number of passed test cases and number of failed test cases. In an embodiment of the present invention, the system further comprises a reporting module configured to interface and provide the test execution results to one or more test management tools. In an embodiment of the present invention, the one or more test management tools comprise Jira-Zephyr, Hewlett Packard Application Lifecycle Management (HP ALM), Microsoft Team Foundation Server (TFS) and IBM Rational Quality Manager (RQM).

The computer-implemented method for automating testing of software applications based on wireframe of the software applications, via program instructions stored in a memory and executed by a processor, comprises creating one or more test cases by providing one or more steps corresponding to the one or more test cases based on wireframe of one or more software applications under development. The computer-implemented method further comprises associating one or more objects, corresponding action and one or more input parameters to each of the one or more steps of the one or more created test cases. Furthermore, the computer-implemented method further comprises mapping the one or more associated objects to corresponding one or more elements of the one or more software applications, wherein the mapping is performed on completion of the development of the one or more software applications. In addition, the computer-implemented method comprises executing the one or more created test cases, on one or more browsers, using the mapped one or more objects to test the one or more software applications and generate test execution results.

The computer program product for automating testing of software applications based on wireframe of the software applications, comprises a non-transitory computer-readable medium having computer-readable program code stored thereon, the computer-readable program code comprising instructions that when executed by a processor, cause the processor to create one or more test cases by providing one or more steps corresponding to the one or more test cases based on wireframe of one or more software applications under development. The processor further associates one or more objects, corresponding action and one or more input parameters to each of the one or more steps of the one or more created test cases. Furthermore, the processor maps the one or more associated objects to corresponding one or more elements of the one or more software applications, wherein the mapping is performed on completion of the development of the one or more software applications. The processor also executes the one or more created test cases, on one or more browsers, using the mapped one or more objects to test the one or more software applications and generate test execution results.

BRIEF DESCRIPTION OF THE ACCOMPANYING DRAWINGS

The present invention is described by way of embodiments illustrated in the accompanying drawings wherein:

FIG. 1H is a screenshot illustrating a sample test case created using Behavior Driven Development (BDD) technique, in accordance with an exemplary embodiment of the present invention;

Figure 2:
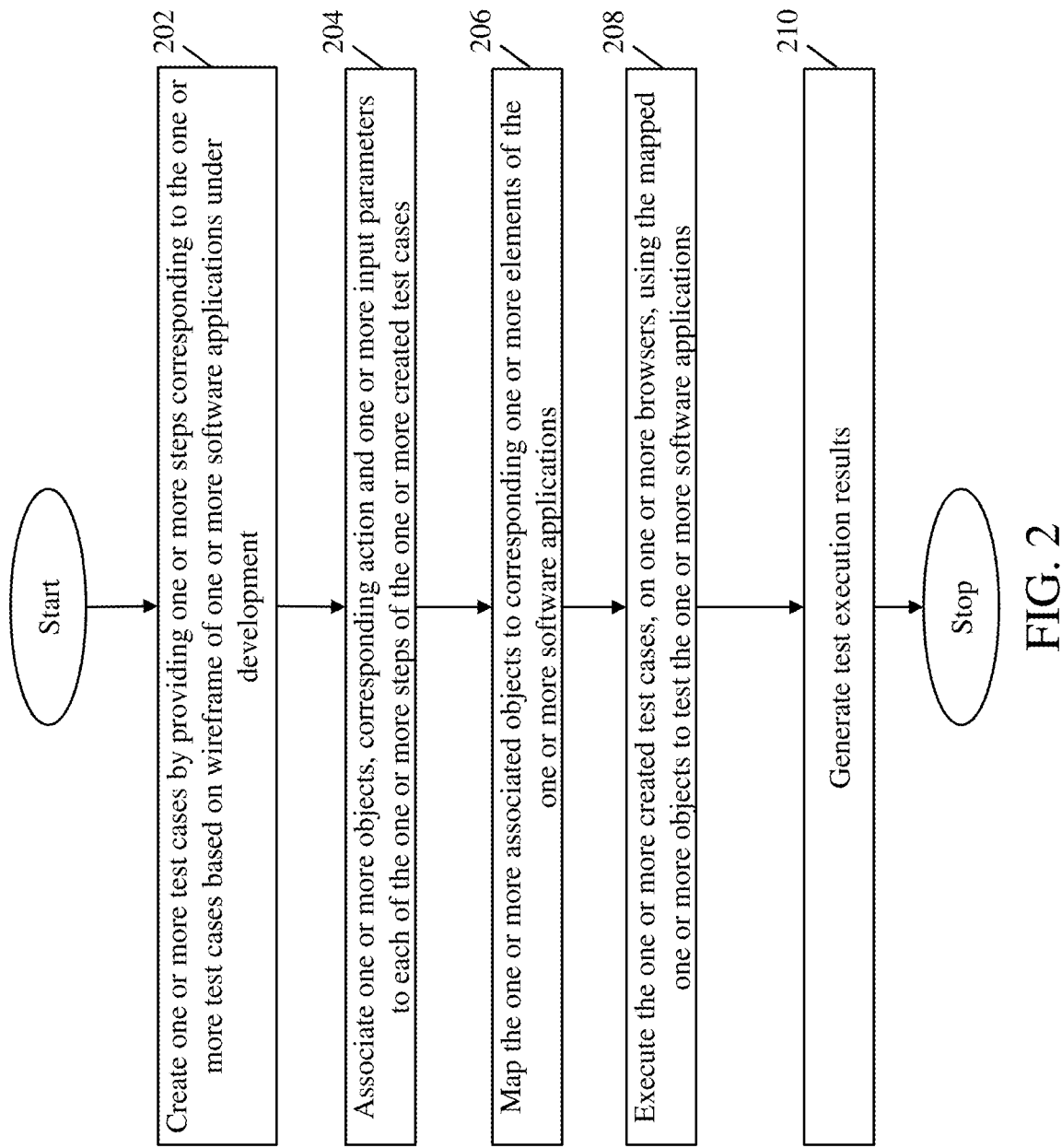
Figure 3:
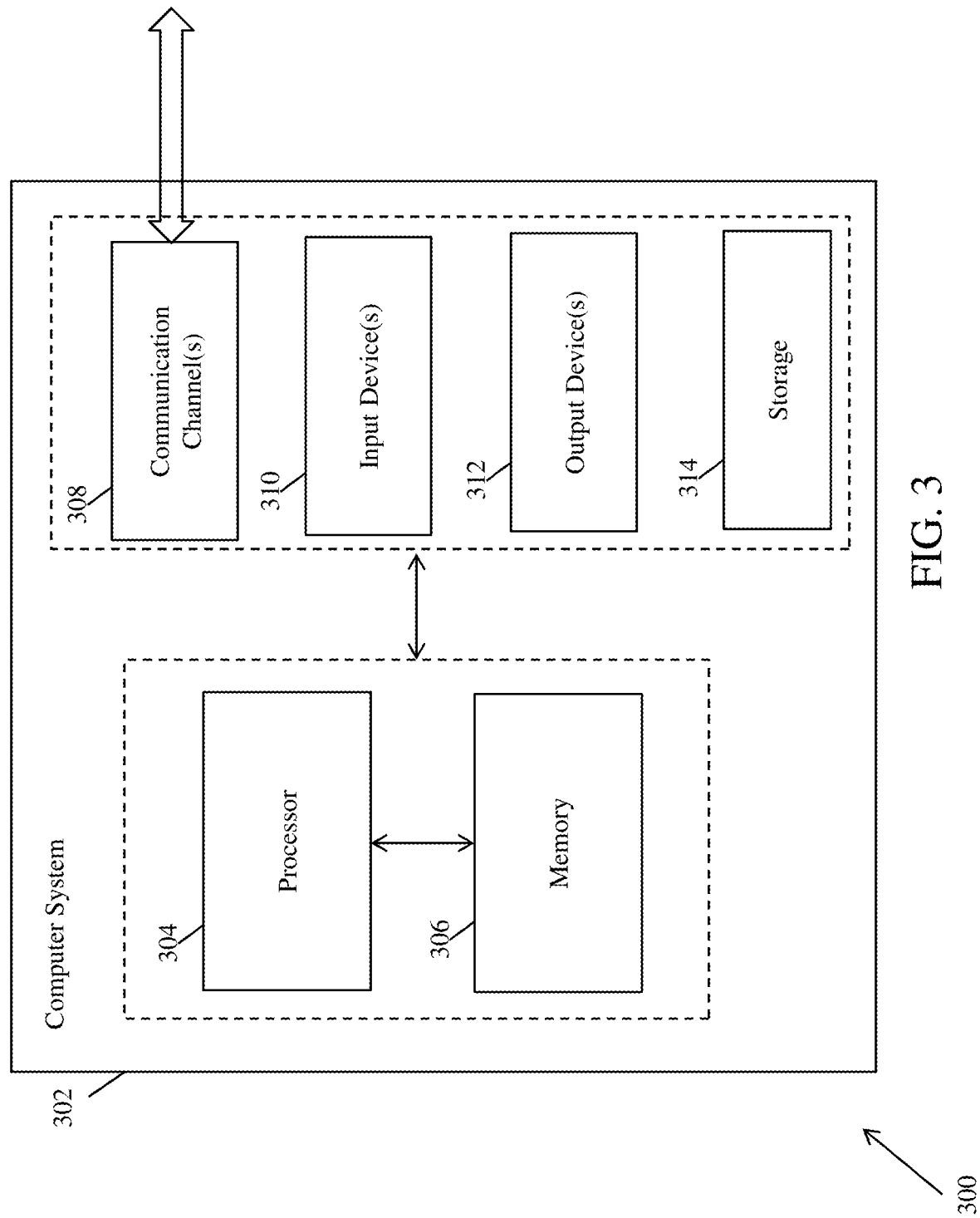

FIG. 2 is a flowchart illustrating a method for automating testing of one or more software applications based on wireframe of the one or more software applications, in accordance with an embodiment of the present invention; and FIG. 3 illustrates an exemplary computer system for automating testing of one or more software applications based on wireframe of the one or more software applications, in accordance with an embodiment of the present invention.

DETAILED DESCRIPTION OF THE INVENTION

A system and method for automating testing of one or more software applications based on wireframe of the one or more software applications is described herein. The invention provides for a system and method that provides a user friendly language for testing which facilitates the business users and technical users to easily test applications without requiring support from expensive and niche resources. Further, the invention provides for a system and method that facilitates creating test cases from wireframe while software applications are in development phase. Furthermore, the invention provides for an intuitive and feature rich testing tool that identifies changes to user interface objects and proactively allows the user to update these objects. In addition, the invention provides for a system and method that supports multiple browsers/platforms thereby permitting cross-browser testing. Also, the invention provides for a system and method that allows parallel and distributed execution of test cases. The invention further provides for a system and method that can be leveraged for performing exploratory testing in agile environments.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
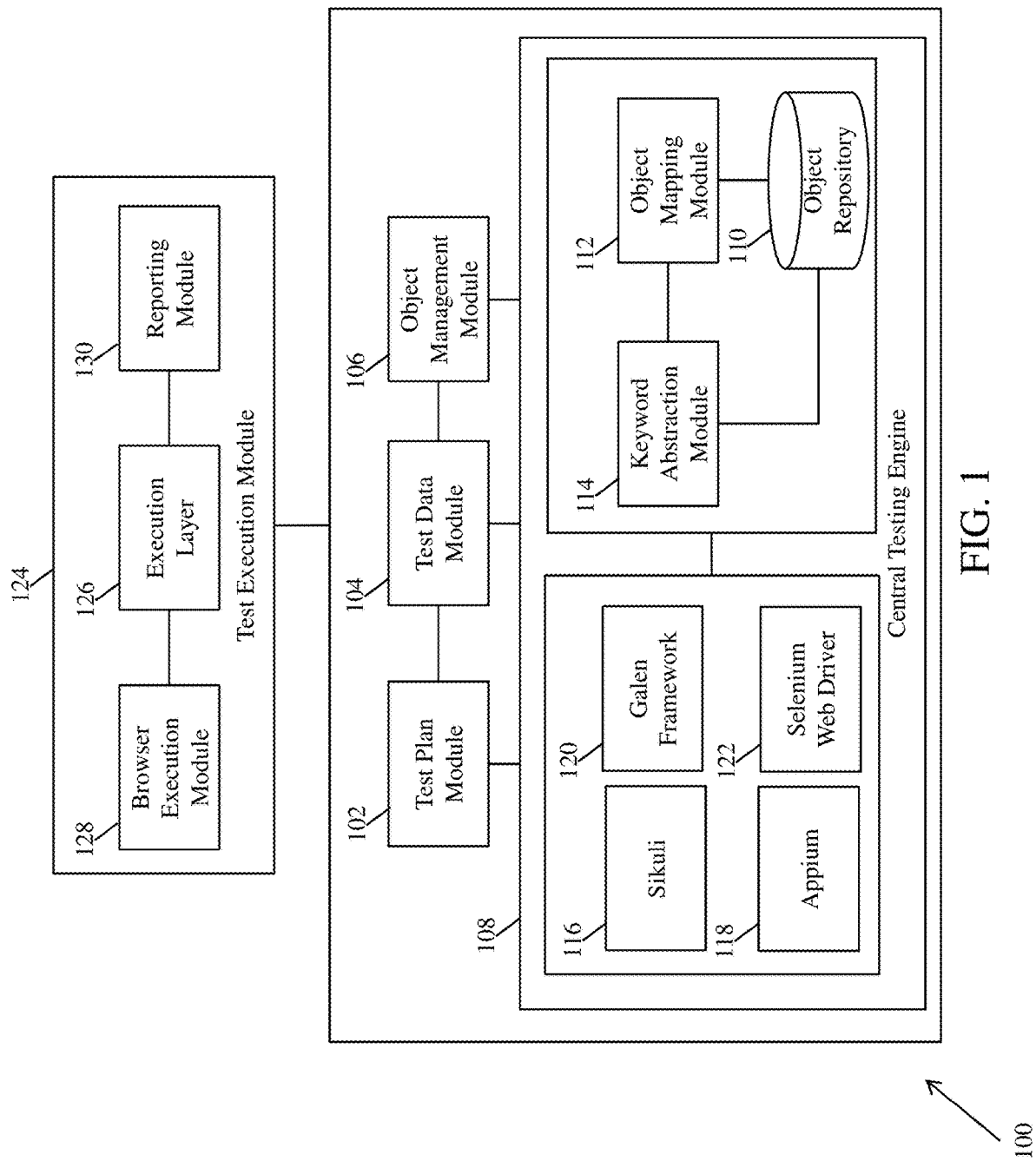
FIG. 1 is a block diagram illustrating a system for automating testing of one or more software applications based on wireframe of the one or more software applications, in accordance with an embodiment of the present invention.

FIG. 1 is a block diagram illustrating a system 100 for automating testing of one or more software applications based on wireframe of the one or more software applications, in accordance with an embodiment of the present invention. The system 100 comprises a test plan module 102, a test data module 104, an object management module 106, a central testing engine 108 and a test execution module 124. In an embodiment of the present invention, the central testing engine 108 further comprises an object repository 110, an object mapping module 112, a keyword abstraction module 114 and one or more third party testing tools such as, but not limited to, Sikuli 116, Appium 118, Galen framework 120 and Selenium web driver 122.

The test plan module 102 is a front-end user interface that facilitates one or more users to create one or more test cases for testing the one or more software applications. In an embodiment of the present invention, testing the one or more software applications comprise testing one or more elements of the one or more software applications. The one or more software applications include, but not limited to, web applications, mobile applications and mobile hybrid applications. Further, the one or more test cases are created for one or more testing projects comprising one or more testing scenarios. Furthermore, each of the one or more test cases has a navigation flow that comprises a series of steps.

Figure 1A:
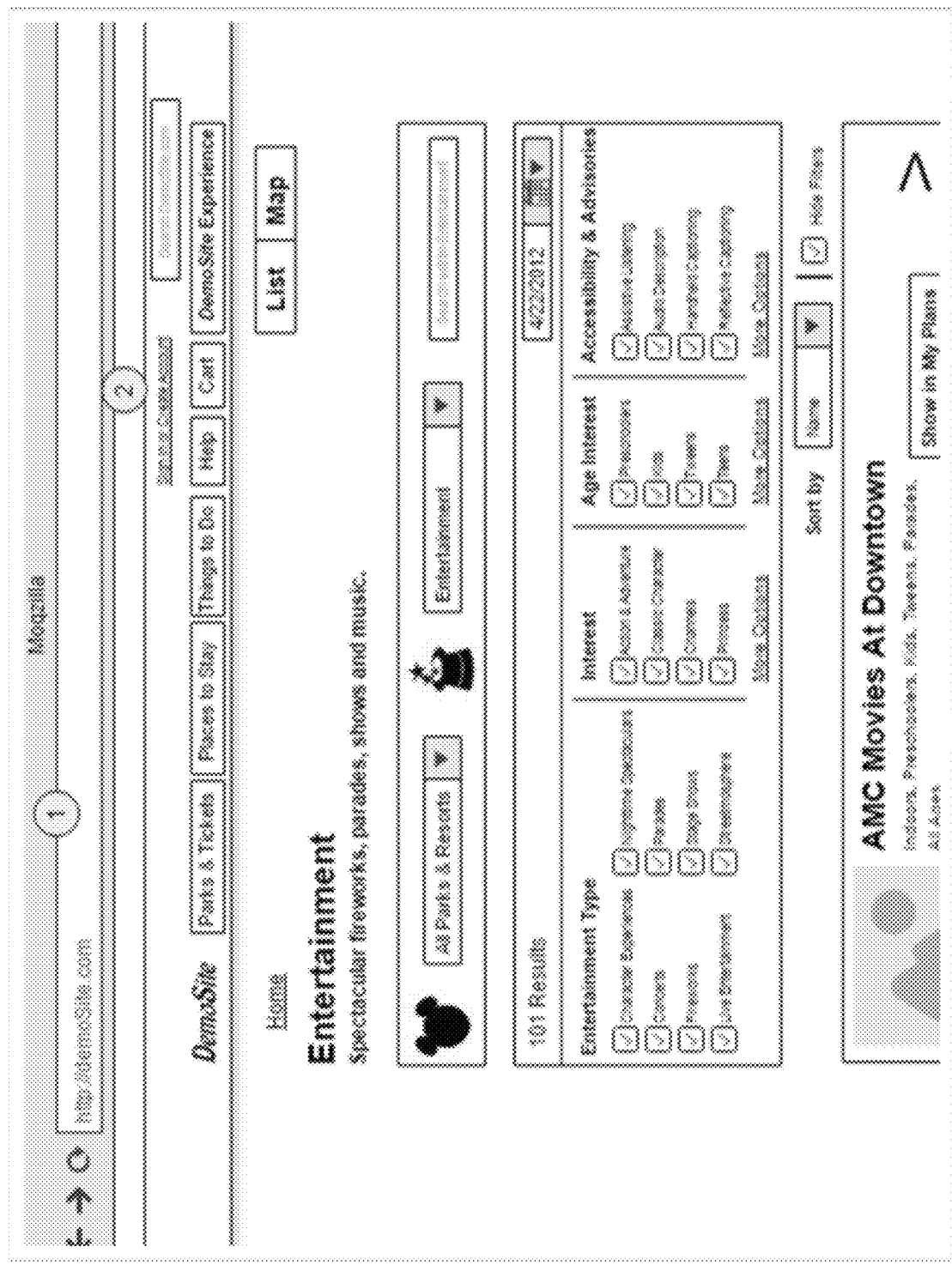
FIGS. 1A, 1B and 1C illustrate a wireframe of a software application under development and a sample navigational flow of a test case comprising nine test steps based on the wireframe, in accordance with an exemplary embodiment of the present invention.
Figure 1B:
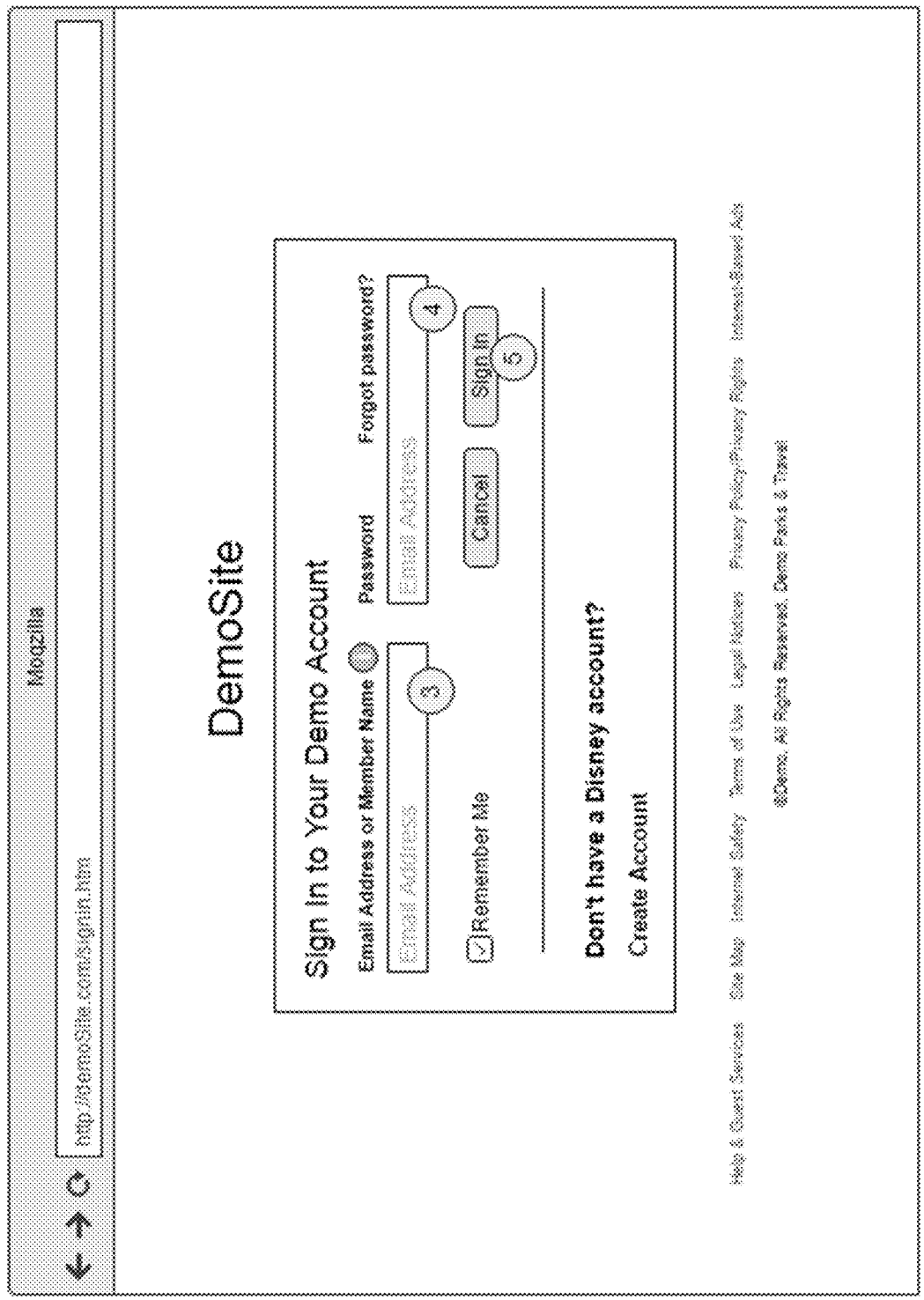
Figure 1C:
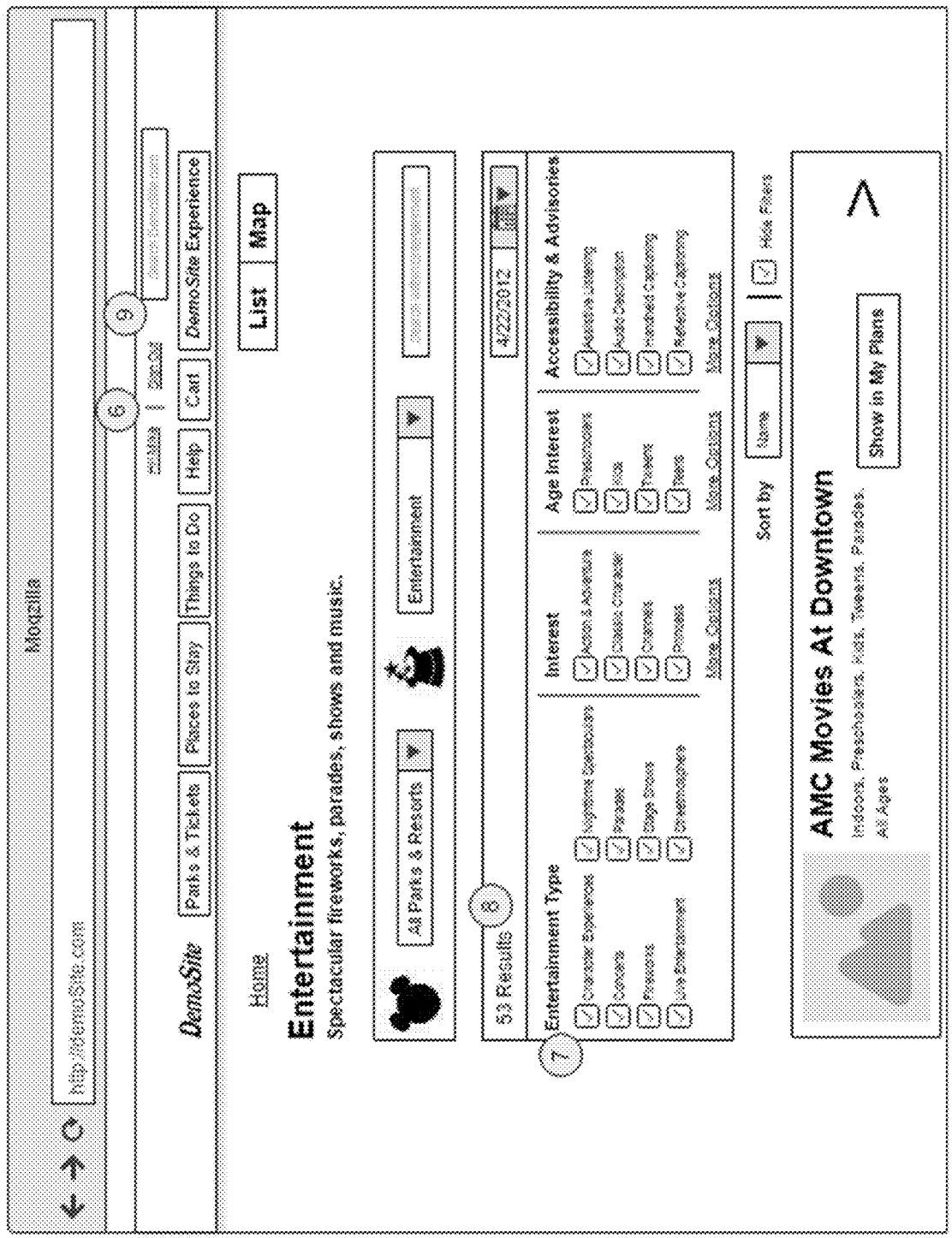

In an embodiment of the present invention, the test plan module 102 provides options to the one or more users to create the navigation flow of the one or more test cases by providing one or more steps corresponding to the one or more test cases based on wireframe of the one or more software applications under development. In an embodiment of the present invention, the navigation flow of the one or more test cases comprise one or more steps of the one or more test cases along with their description. FIGS. 1A, 1B and 1C illustrate a wireframe of a software application under development and a sample navigational flow of a test case comprising nine test steps based on the wireframe, in accordance with an exemplary embodiment of the present invention. The nine test steps based on the wireframe pertaining to FIGS. 1A, 1B and 1C are as follows:
1. Launch the browser and go to the webpage (FIG. 1)
2. Click the "Sign In" Link (FIG. 1)
3. Enter the "User Name" (FIG. 2)
4. Enter the "Password" (FIG. 2)
5. Click the "Sign in" button (FIG. 2)
6. Verify the "Sign Out" link (FIG. 3)
7. Click the "Character Experience Checkbox" (FIG. 3)
8. Verify the search result (FIG. 3)
9. Click the sign out link. (FIG. 3)

Once the one or more test cases are created, the one or more users associate one or more objects, corresponding action and one or more input parameters to each of the one or more steps of the created one or more test cases. The one or more objects correspond to the one or more elements of the one or more software applications to be tested. Further, the one or more objects comprise one or more pre-stored functions used for testing the one or more corresponding elements of the one or more software applications. The one or more pre-stored functions are modifiable thereby facilitating testing of additional functionalities and features of the one or more software applications. Furthermore, the one or more users modify the one or more pre-stored functions based on testing requirements via the test plan module 102. In an exemplary embodiment of the present invention, the one or more pre-stored functions are Java programs.

In an embodiment of the present invention, the one or more pre-stored functions are mapped to the one or more objects along with the corresponding action. Further, the test plan module 102 provides a type-ahead feature for efficiently and intelligently associating the one or more mapped objects and corresponding actions with each of the one or more steps of the created one or more step cases. On execution, the one or more pre-stored functions facilitate performing the one or more actions corresponding to the one or more associated objects using corresponding input parameters. In an embodiment of the present invention, the action corresponding to the one or more objects comprise opening a browser window or tab, scrolling a webpage, clicking on one or more fields of the one or more software applications and inputting information such as, but not limited to, username and passwords.

In an exemplary embodiment of the present invention, the test plan module 102 provides a "test design" screen. Further, the navigation flow of the one or more test cases comprising the one or more test steps is provided based on the wireframe of the software applications to a workspace in the "test design" screen. In an embodiment of the present invention, the navigation flow is provided by the one or more users. In another embodiment of the present invention, the navigation flow of the one or more test cases is fetched, either automatically or by the one or more users, from a repository. The one or more users then associate the one or more objects corresponding to each of the one or more steps of the one or more test cases. In an embodiment of the present invention, the one or more users associate the one or more objects to the one or more steps of the one or more test cases by selecting and fetching the one or more objects from the object repository 110 to the workspace in the "test design" screen. In another embodiment of the present invention, the one or more users drag and drop the one or more objects from the objects repository 110 to the workspace in the "test design" screen. In another embodiment of the present invention, the one or more users select the one or more objects from a pre-configured "objects list". The one or more users then select an action from a list of pre-configured actions corresponding to the one or more selected objects. The one or more users also provide input parameters corresponding to the one or more selected objects or select input parameters from a list of pre-stored input parameters corresponding to the one or more selected objects. The one or more users then map each of the one or more objects to corresponding step of the navigational flow of the one or more test cases. Once the one or more users have provided all the information related to each step of the one or more test cases, the one or more users save the one or more created test cases via the test plan module 102. The test plan module 102 also provides options to the one or more users to view, modify and delete the one or more saved test cases.

In an embodiment of the present invention, the one or more users use one or more electronic devices (not shown) to access the system 100 via the test plan module 102. Further, the one or more electronic devices (not shown) include, but not limited to, laptops, desktops and handheld devices such as tablets and mobile phones.

The test data module 104 is configured to store the input parameters corresponding to the one or more saved test cases. Further, the test data module 104 provides options to the one or more users to provide one or more alternate sets of input parameters via the test plan module 102 thereby facilitating testing of the software applications using a variety of input parameters.

The object management module 106 is configured to facilitate the one or more users to manage the one or more objects. Further, managing the one or more objects include, but not limited to, adding, viewing, modifying and deleting objects. Furthermore, the object management module 106 provides options to the one or more users to analyze impact on the one or more test cases in case of any modifications to the one or more objects associated with the one or more test cases. Also, the object management module 106 monitors and maintains a log of modifications to the one or more objects which facilitates the one or more users to monitor and update the modifications.

In an embodiment of the present invention, the one or more users add the one or more objects and associated actions required for testing the launched software application by providing logic/functions/programs for performing the associated actions via the object management module 106. In an exemplary embodiment of the present invention, the object management module 106 provides one or more options to the one or more users to provide one or more Java programs that facilitate performing one or more actions. Further, the one or more Java programs are reflected as corresponding one or more objects in the "objects list" by the test plan module 102. The one or more objects added via the object management module 106 are also stored in the object repository 110 residing in the central testing engine 108 for use by the one or more users during the test design phase.

The object mapping module 112 is configured to map the one or more objects of the created one or more test cases to the one or more elements of the one or more software applications to be tested. In an embodiment of the present invention, the one or more objects are mapped once the development of the one or more software applications is complete and the one or more software applications are ready for testing. In an embodiment of the present invention, the object mapping module 112 provide options to the one or more users to map the one or more objects of the created one or more test cases by accessing a repository containing information pertaining to each of the one or more elements of the one or more software applications. The one or more users then associate each of the one or more objects with the information pertaining to each of the one or more corresponding elements of the one or more software applications.

Once the mapping is completed, information pertaining to the one or more mapped elements is associated and uploaded with the created one or more test cases. Further, the information pertaining to the one or more mapped elements comprise, but not limited to, property values for identifying the one or more mapped elements of the developed software application. In an embodiment of the present invention, login tab of a software application is mapped to an object named "login" which facilitates in clicking the login tab. In another embodiment of the present invention, username tab of the software application is mapped to an object named "username" which facilitates in automatically entering a username (which is the input parameter associated with the object "username").

Figure 1D:
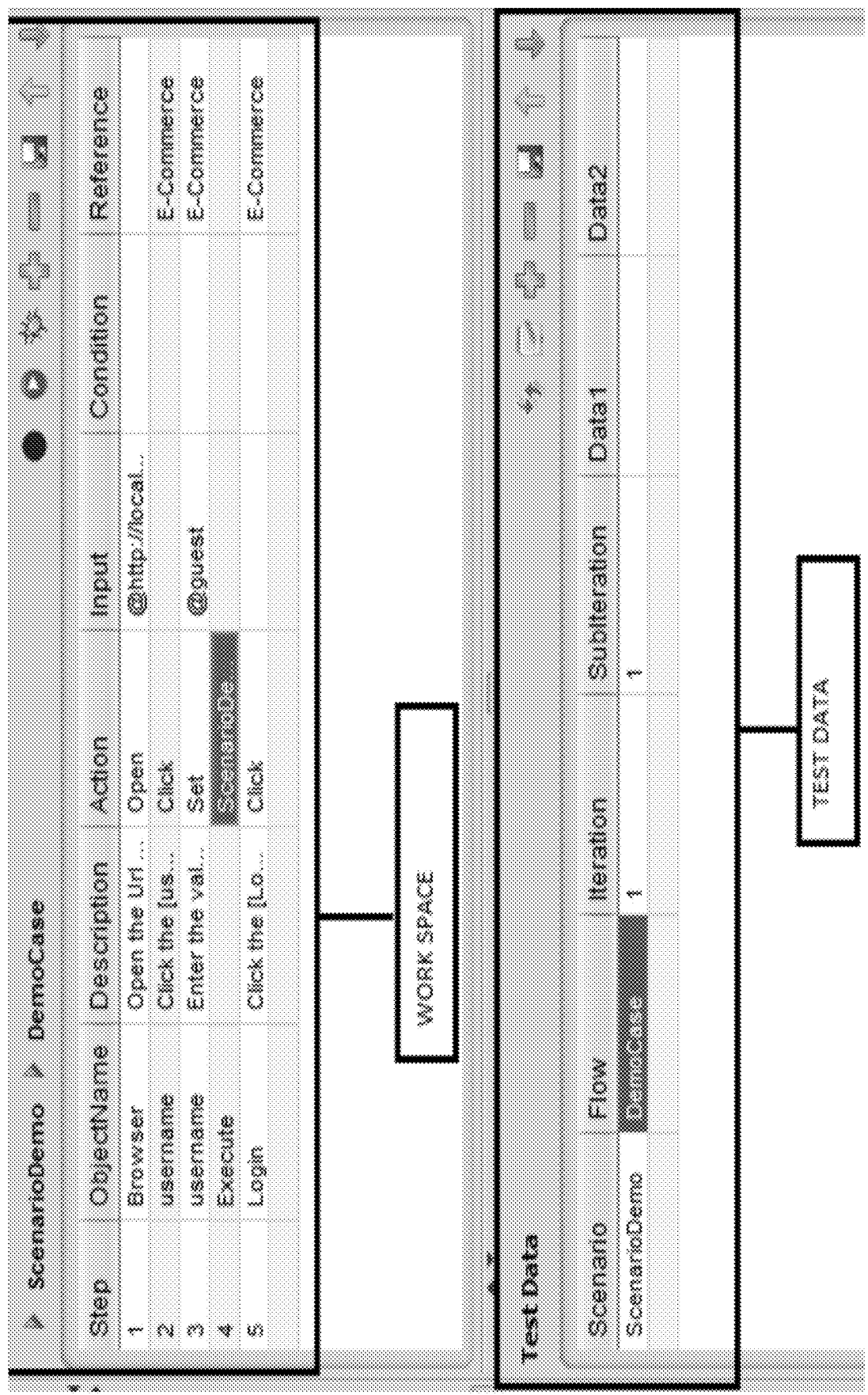
FIG. 1D is a sample screenshot of a "test design" screen for creating a test case named "democase", in accordance with an exemplary embodiment of the present invention.

FIG. 1D is a sample screenshot of a "test design" screen for creating a test case named "democase", in accordance with an exemplary embodiment of the present invention.

The keyword abstraction module 114 is configured to facilitate the one or more users to define the one or more actions using one or more keywords. The one or more keywords used to define the one or more actions comprise, but not limited to, click, submit, input text and select value. Further, the one or more defined actions are associated with the one or more pre-stored functions that facilitate performing the one or more actions.

Once the one or more test cases are created and the one or more objects are associated and mapped, the one or more users execute the one or more created test cases. The test plan module 102 provides one or more options to the one or more users to test the one or more software applications by scheduling automatic execution of the one or more created test cases on the test execution module 124. Further, the one or more users may group two or more test cases into one or more test suites for execution via the test plan module 102.

Figure 1E:
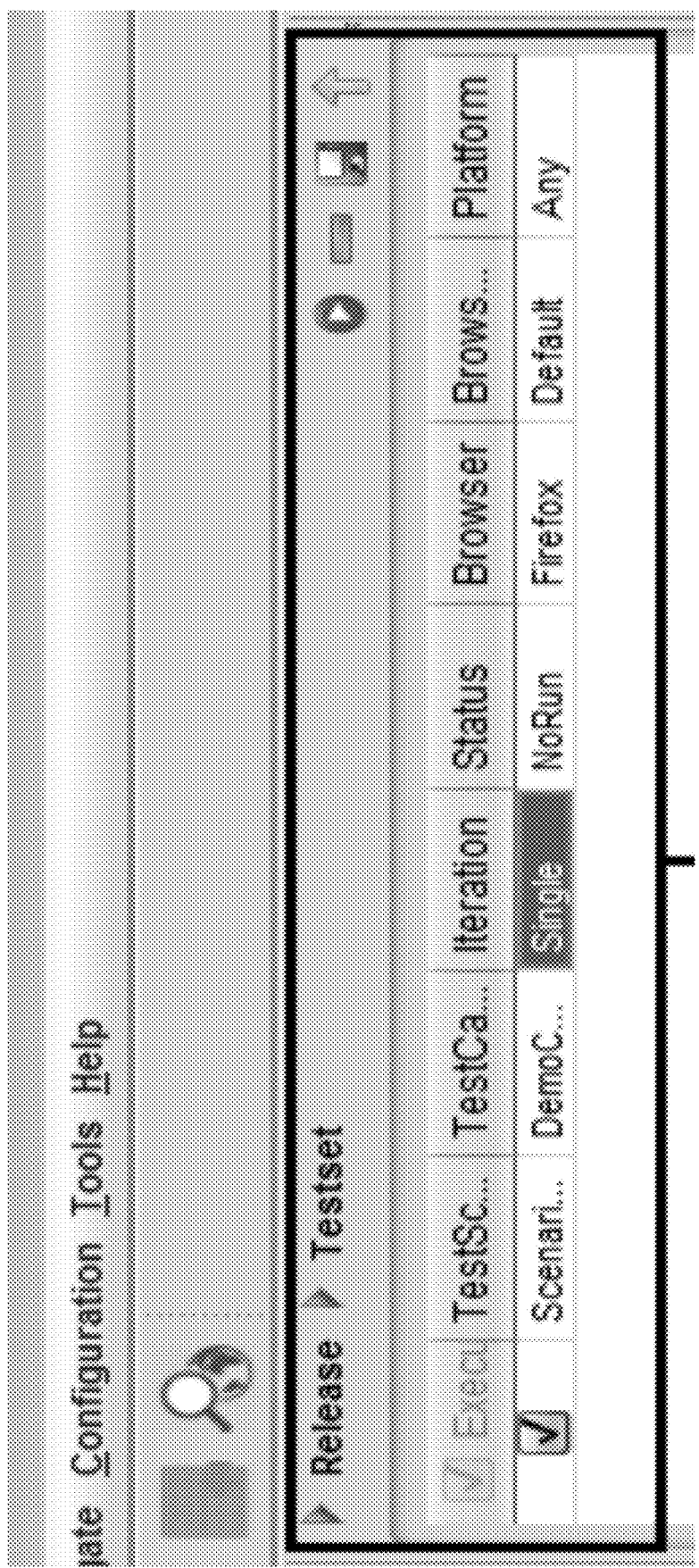
FIG. 1E is a sample screenshot of a "test execution" screen for executing the created test case named "democase", in accordance with an exemplary embodiment of the present invention.

In an embodiment of the present invention, the test plan module 102 provides a "test execution screen" to the one or more users for test execution. The test execution screen comprises tabs and fields such as, but not limited to, project view, test suite details, browser option, test scenario, test case and iteration to facilitate the one or more users to execute the one or more test cases. FIG. 1E is a sample screenshot of a "test execution" screen for executing the created test case named "democase", in accordance with an exemplary embodiment of the present invention.

The test execution module 124 comprises an execution layer 126, a browser execution module 128 and a reporting module 130.

The execution layer 126 facilitates interfacing the browser execution module 128 with other components of the system 100 for execution of the one or more created test cases.

The browser execution module 128 is configured to execute the one or more created test cases on one or more browsers using the mapped one or more objects to test the one or more software applications. The one or more browsers include, but not limited to, Firefox, Chrome, Internet Explorer and Safari. The browser execution module 128 communicates with the one or more third party testing tools such as, but not limited to, Sikuli 116, Appium 118, Galen framework 120 and Selenium web driver 122. The one or more third party testing tools then interact with the one or more software applications for testing. In an exemplary embodiment of the present invention, Sikuli 116 is used for image based testing automation. Further, Sikuli 116 recognizes objects of the one or more software applications as images. In an exemplary embodiment of the present invention, Appium 118 is used for testing one or more mobile software applications. Further, Appium 118 facilitates in executing the one or more created test cases on mobile devices, emulators and simulators. In an exemplary embodiment of the present invention, the Galen framework 120 is used for testing of layout and graphical user interface of the one or more software applications and validate whether the one or more software applications are rendered as per the original requirement in wireframe. In an exemplary embodiment of the present invention, Selenium web driver 122 is used for testing web based software applications. Further, the Selenium web driver 122 recognizes the one or more objects of the one or more software applications using object attributes such as, but not limited to, ID, Name and XPATH.

During operation, the browser execution module 128 facilitates executing the one or more test cases by initiating execution of the one or more pre-stored functions corresponding to the one or more mapped objects. Further, executing the one or more pre-stored functions facilitates in performing the action corresponding to the one or more mapped objects and testing the corresponding one or more mapped elements of the one or more software applications.

In an embodiment of the present invention, the browser execution module 128 facilitates execution of the one or more created test cases simultaneously thereby facilitating faster execution. The browser execution module 128 also facilitates execution of the one or more test cases on multiple machines. Once the execution is complete, the control is transferred to the reporting module 130.

Figure 1F:
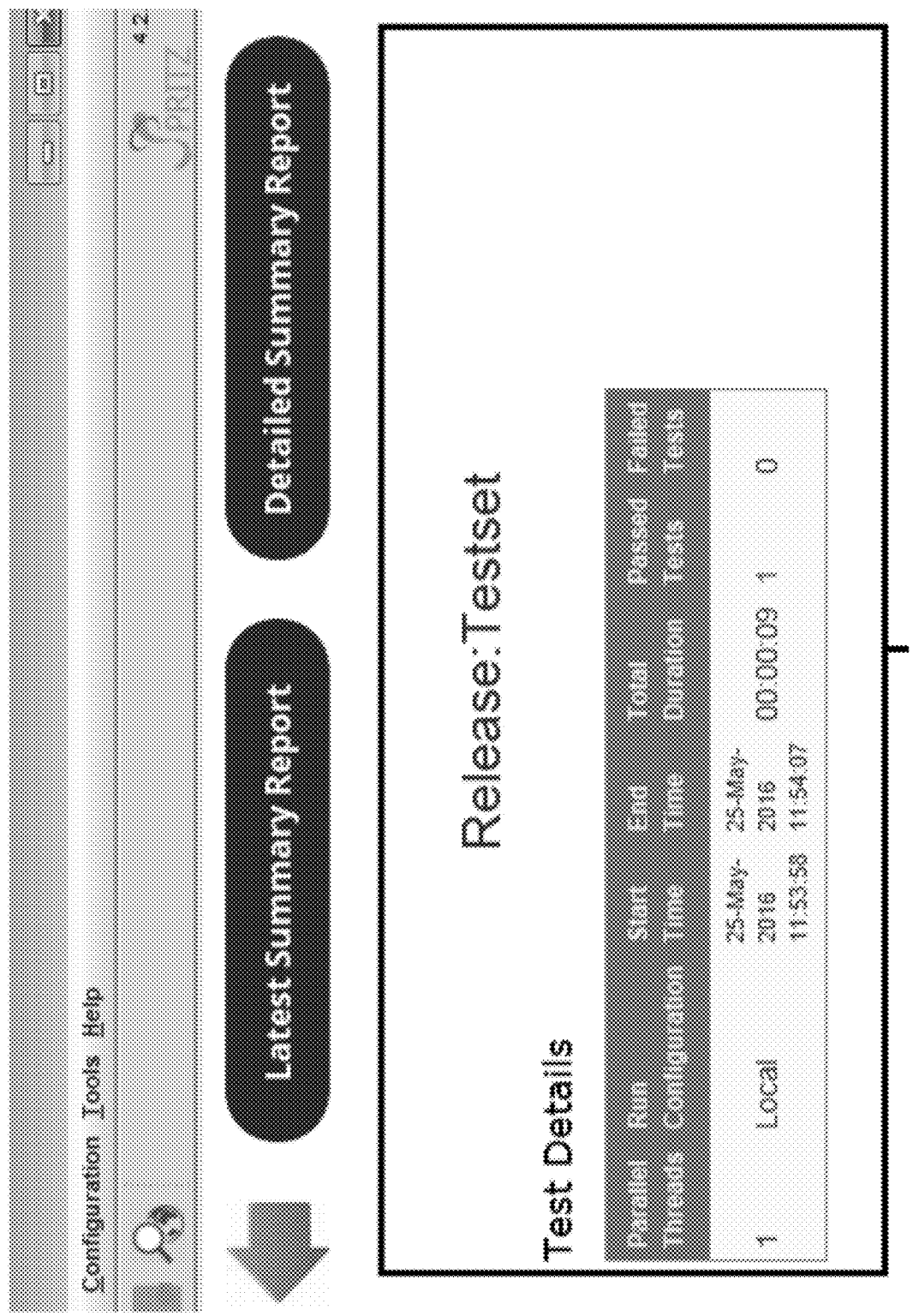
FIG. 1F is a sample screenshot of a "dashboard" screen illustrating test details for an executed test suite, in accordance with an exemplary embodiment of the present invention.
Figure 1G:
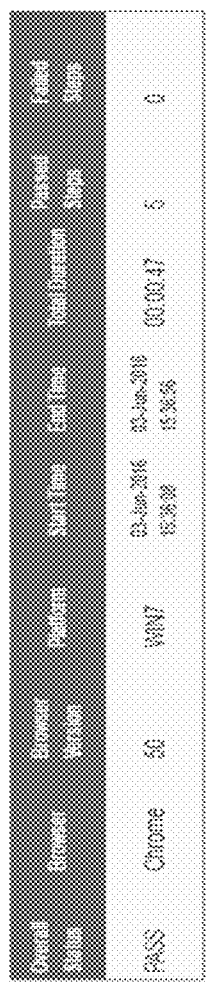
FIG. 1G is a sample screenshot illustrating detailed test execution results, in accordance with an exemplary embodiment of the present invention.
Figure 1G:
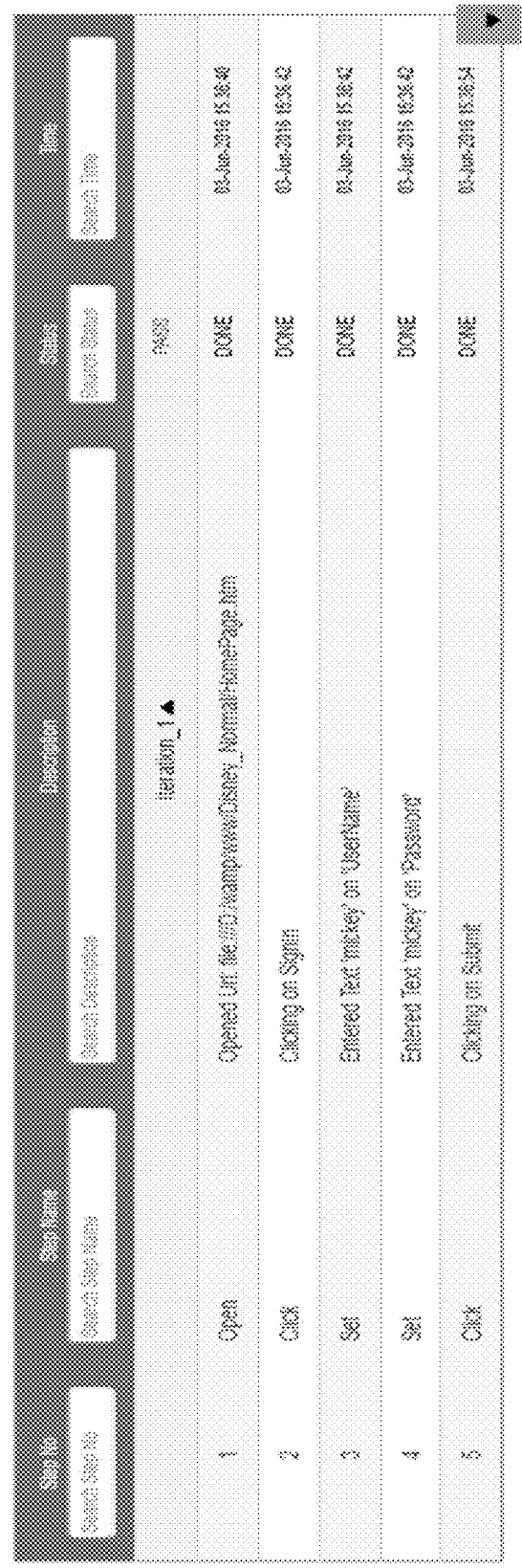

The reporting module 130 is configured to provide execution results to the one or more users. Further, the reporting module 130 provides a dashboard that renders results of the execution in a meaningful manner on the one or more electronic devices of the one or more users. In an embodiment of the present invention, the results of the execution include, but not limited to, test details such as start time of execution, end time of execution, date of execution, run configuration of execution, total duration of execution, number of passed test cases and number of failed test cases. In an embodiment of the present invention, the reporting module 130 provides summary of the results as well as detailed execution results to the one or more users. FIG. 1F is a sample screenshot of a "dashboard" screen illustrating test details for an executed test suite, in accordance with an exemplary embodiment of the present invention. FIG. 1G is a sample screenshot illustrating detailed test execution results, in accordance with an embodiment of the present invention.

In an embodiment of the present invention, the reporting module 130 is configured to interface and provide the test execution results to one or more test management tools (not shown). In an embodiment of the present invention, the one or more test management tools (not shown) comprise, but not limited to, Jira-Zephyr, Hewlett Packard Application Lifecycle Management (HP ALM), Microsoft Team Foundation Server (TFS) and IBM Rational Quality Manager (RQM). The reporting module 130 shares screenshots and reports defects and bugs to the one or more test management tools. In an embodiment of the present invention, the reporting module 130 provides detailed test execution results by adding annotations on the screenshots along with detailed test steps for highlighting defects and bugs.

In an embodiment of the present invention, the system 100 facilitates the one or more users to perform exploratory testing for simultaneous learning, designing and testing of the one or more test cases. Further, the one or more test cases created during exploratory testing are stored for use during subsequent testing.

Figure 1H:
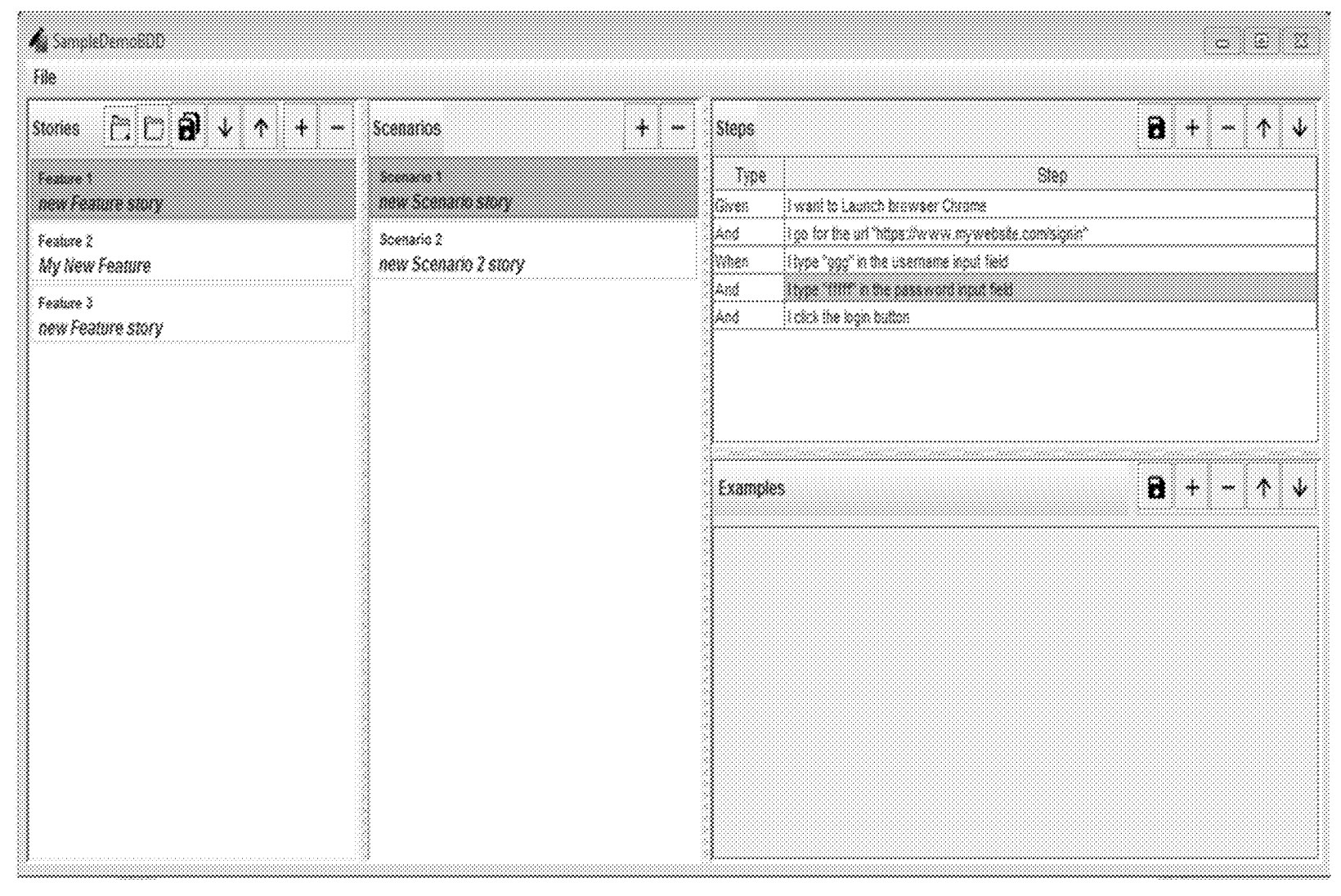

In an embodiment of the present invention, the system 100 facilitates the one or more users to perform look and feel testing by placing the one or more elements of the user interface on the one or more browsers. In an embodiment of the present invention, the system 100 facilitates in leveraging a script less Behavior Driven Development (BDD) technique to facilitate the one or more users to create feature files, import the created feature files and create test cases using the imported feature files. Further, the BDD technique uses a Domain-Specific Language (DSL) that is used for creating natural language constructs (such as, but not limited to, sentences in human-understandable language like English). The natural language constructs are further used for creating the feature files. FIG. 1H is a screenshot illustrating a sample test case created using the BDD technique, in accordance with an exemplary embodiment of the present invention.

In an embodiment of the present invention, the system 100 is scalable to incorporate testing of web services. The system 100 is further configured to test broken links of the one or more software applications.

FIG. 2 is a flowchart illustrating a method for automating testing of one or more software applications based on wireframe of the one or more software applications, in accordance with an embodiment of the present invention.

At step 202, one or more test cases are created for testing one or more software applications by providing one or more steps corresponding to the one or more test cases based on wireframe of the one or more software applications under development. In an embodiment of the present invention, testing the one or more software applications comprise testing one or more elements of the one or more software applications. The one or more software applications include, but not limited to, web applications, mobile applications and mobile hybrid applications. Further, the one or more test cases are created for one or more testing projects comprising one or more testing scenarios. Furthermore, each of the one or more test cases has a navigation flow that comprises a series of steps.

In an embodiment of the present invention, one or more users provide the navigation flow of the one or more test cases by providing the one or more steps corresponding to the one or more test cases. In an embodiment of the present invention, the navigation flow of the one or more test cases comprise one or more steps of the one or more test cases along with their description.

At step 204, the one or more users associate one or more objects, corresponding action and one or more input parameters to each of the one or more steps of the created one or more test cases. The one or more objects correspond to the one or more elements of the one or more software applications to be tested. Further, the one or more objects comprise one or more pre-stored functions used for testing the one or more corresponding elements of the one or more software applications. The one or more pre-stored functions are modifiable thereby facilitating testing of additional functionalities and features of the one or more software applications. Furthermore, the one or more users modify the one or more pre-stored functions based on testing requirements. In an exemplary embodiment of the present invention, the one or more pre-stored functions are Java programs. On execution, the one or more pre-stored functions facilitate performing the one or more actions corresponding to the one or more associated objects using corresponding input parameters. In an embodiment of the present invention, the action corresponding to the one or more objects comprise opening a browser window or tab, scrolling a webpage, clicking on one or more fields of the one or more software applications and inputting information such as, but not limited to, username and passwords.

At step 206, the one or more objects of the created one or more test cases are mapped to the one or more elements of the one or more software applications to be tested. In an embodiment of the present invention, the one or more objects are mapped once the development of the one or more software applications is complete and the one or more software applications are ready for testing. In an embodiment of the present invention, the one or more users map the one or more objects of the created one or more test cases by accessing a repository containing information pertaining to each of the one or more elements of the one or more software applications. The one or more users then associate each of the one or more objects with the information pertaining to each of the one or more corresponding elements of the one or more software applications.

Once the mapping is completed, information pertaining to the one or more mapped elements is associated and uploaded with the created one or more test cases. Further, the information pertaining to the one or more mapped elements comprise, but not limited to, property values for identifying the one or more mapped elements of the developed software application. In an embodiment of the present invention, login tab of a software application is mapped to an object named "login" which facilitates in clicking the login tab. In another embodiment of the present invention, username tab of the software application is mapped to an object named "username" which facilitates in automatically entering a username (which is the input parameter associated with the object "username").

At step 208, the one or more created test cases are executed on one or more browsers using the mapped one or more objects to test the one or more software applications. The one or more browsers include, but not limited to, Firefox, Chrome, Internet Explorer and Safari. Further, the one or more test cases are executed by communicating with the one or more third party testing tools such as, but not limited to, Sikuli, Appium, Galen framework and Selenium web driver. The one or more third party testing tools interact with the one or more software applications for testing.

During operation, execution of the one or more test cases initiates execution of the one or more pre-stored functions corresponding to the one or more mapped objects. Further, executing the one or more pre-stored functions facilitates in performing the action corresponding to the one or more mapped objects and testing the corresponding one or more mapped elements of the one or more software applications.

In an embodiment of the present invention, the one or more created test cases are executed on the one or more browsers simultaneously thereby facilitating faster execution. In an embodiment of the present invention, the one or more test cases are executed on multiple machines. Once the execution is complete, the control is transferred to step 210.

At step 210, test execution results are generated. In an embodiment of the present invention, the test execution results comprise test details such as, but not limited to, start time of execution, end time of execution, date of execution, run configuration of execution, total duration of execution, number of passed test cases and number of failed test cases. In an embodiment of the present invention, the test execution results are provided to one or more test management tools. In an embodiment of the present invention, the one or more test management tools (not shown) comprise, but not limited to, Jira-Zephyr, Hewlett Packard Application Lifecycle Management (HP ALM), Microsoft Team Foundation Server (TFS) and IBM Rational Quality Manager (RQM).

FIG. 3 illustrates an exemplary computer system for automating testing of one or more software applications based on wireframe of the one or more software applications, in accordance with an embodiment of the present invention The computer system 302 comprises a processor 304 and a memory 306. The processor 304 executes program instructions and may be a real processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A computer system for automating testing of one or more software applications based on wireframe of the one or more software applications, the computer system comprising a microprocessor communicatively coupled to a memory, the computer system further comprising:

a test plan module configured to:

create, using the microprocessor, a plurality of test cases by providing one or more test steps corresponding to each test case of the plurality of the test cases based on wireframe of one or more software applications under development;

fetch, using the microprocessor, navigation flow of the one or more test cases from a repository, and associate one or more objects corresponding to each of the one or more steps of the one or more test cases using the navigation flow, wherein the one or more objects comprise one or more pre-stored functions used for testing one or more elements of the one or more software applications; and modify, using the microprocessor, the one or more pre-stored functions for facilitating testing of additional functionalities and features of the one or more software applications;

an object mapping module configured to map, using the microprocessor, the one or more associated objects to corresponding one or more elements of the one or more software applications, wherein the mapping is performed on completion of the development of the one or more software applications; and a browser execution module configured to execute, using the microprocessor, two or more of the created test cases grouped into one or more test suites such that the one or more test steps of the created two or more test cases are executed simultaneously on multiple browsers installed in multiple computer systems, using the mapped one or more objects to test the one or more software applications and generate test execution results.

2. The computer system of claim 1, wherein the one or more software applications comprise web applications, mobile applications and mobile hybrid applications.

3. The computer system of claim 1, wherein an action corresponding to the one or more objects comprise opening a browser window or tab, scrolling a webpage, clicking on one or more fields of the one or more software applications and inputting information.

4. The computer system of claim 1, wherein the one or more browsers comprise Firefox, Chrome, Internet Explorer and Safari.

5. The computer system of claim 1, wherein the test execution results comprise start time of execution, end time of execution, date of execution, total duration of execution, run configuration, number of passed test cases and number of failed test cases.

6. The computer system of claim 1 further comprising a reporting module configured to interface and provide the test execution results to one or more test management tools.

7. The computer system of claim 6, wherein the one or more test management tools comprise Jira-Zephyr, Hewlett Packard Application Lifecycle Management (HP ALM), Microsoft Team Foundation Server (TFS) and IBM Rational Quality Manager (RQM).

8. A computer-implemented method for automating testing of software applications based on wireframe of the software applications, via program instructions stored in a memory and executed by a processor, the computer-implemented method comprising:
   creating a plurality of test cases by providing one or more test steps corresponding to the one or more test cases based on wireframe of one or more software applications under development;
   fetching navigation flow of the one or more test cases from a repository and associating one or more objects corresponding to each of the one or more steps of the one or more test cases using the navigation flow, wherein the one or more objects comprise one or more pre-stored functions used for testing one or more elements of the one or more software applications; and
   modifying the one or more pre-stored functions for facilitating testing of additional functionalities and features of the one or more software applications;
   mapping the one or more associated objects to corresponding one or more elements of the one or more software applications, wherein the mapping is performed on completion of the development of the one or more software applications; and
   executing two or more of the created test cases grouped into one or more test suites such that the one or more test steps of the created two or more test cases are executed in simultaneously on multiple re browsers installed in multiple computer systems, using the mapped one or more objects to test the one or more software applications and generate test execution results.

9. The computer-implemented method of claim 8, wherein the one or more software applications comprise web applications, mobile applications and mobile hybrid applications.

10. The computer-implemented method of claim 8, wherein an action corresponding to the one or more objects comprise opening a browser window or tab, scrolling a webpage, clicking on one or more fields of the one or more software applications and inputting information.

11. The computer-implemented method of claim 8, wherein the one or more browsers comprise Firefox, Chrome, Internet Explorer and Safari.

12. The computer-implemented method of claim 8, wherein the test execution results comprise start time of execution, end time of execution, date of execution, total duration of execution, run configuration, number of passed test cases and number of failed test cases.

13. The computer-implemented method of claim 8 further comprising a step of providing the test execution results to one or more test management tools.

14. The computer-implemented method of claim 13, wherein the one or more test management tools comprise Jira-Zephyr, Hewlett Packard Application Lifecycle Management (HP ALM), Microsoft Team Foundation Server (TFS) and IBM Rational Quality Manager (RQM).

15. A computer program product for automating testing of software applications based on wireframe of the software applications, the computer program product comprising:
   a non-transitory computer-readable medium having computer-readable program code stored thereon, the computer-readable program code comprising instructions that when executed by a processor, cause the processor to:
   create a plurality of test cases by providing one or more test steps corresponding to the one or more test cases based on wireframe of one or more software applications under development;
   fetch navigation flow of the one or more test cases from a repository and associate one or more objects corresponding to each of the one or more steps of the one or more test cases using the navigation flow, wherein the one or more objects comprise one or more pre-stored functions used for testing one or more elements of the one or more software applications; and
   modify the one or more pre-stored functions for facilitating testing of additional functionalities and features of the one or more software applications;
   map the one or more associated objects to corresponding one or more elements of the one or more software applications, wherein the mapping is performed on completion of the development of the one or more software applications; and
   execute two or more of the created test cases grouped into one or more test suites such that the one or more test steps of the created test cases are executed simultaneously on multiple browsers installed in multiple computer systems, using the mapped one or more objects to test the one or more software applications and generate test execution results.

* * * * *